US010229443B1

(12) United States Patent
Farre et al.

(10) Patent No.: US 10,229,443 B1
(45) Date of Patent: Mar. 12, 2019

(54) PRICE FILTERING BASED ON A USER SPECIFIED SINGLE PRICE FILTERING VALUE

(71) Applicant: Pinterest, Inc., San Francisco, CA (US)

(72) Inventors: Albert Pereta Farre, San Francisco, CA (US); Evan Howell Sharp, San Francisco, CA (US); Rui Jiang, San Bruno, CA (US); Dong Wang, San Mateo, CA (US); Erin Rose Larsen, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 551 days.

(21) Appl. No.: 14/726,270

(22) Filed: May 29, 2015

(51) Int. Cl.
G06Q 30/06 (2012.01)
G06F 17/30 (2006.01)

(52) U.S. Cl.
CPC ... *G06Q 30/0621* (2013.01); *G06F 17/30867* (2013.01)

(58) Field of Classification Search
CPC ............ G06Q 30/0621; G06Q 10/087; G06Q 30/0603; G06Q 30/0613; G06Q 30/0625
USPC ............ 705/26.5, 26.7, 39, 44, 21; 345/420
See application file for complete search history.

(56) References Cited

U.S. PATENT DOCUMENTS

| | | | | |
|---|---|---|---|---|
| 2011/0093361 A1* | 4/2011 | Morales | ............... | G06Q 10/087 705/26.62 |
| 2012/0221430 A1* | 8/2012 | Naghmouchi | ...... | G06Q 30/0283 705/26.7 |
| 2013/0215116 A1* | 8/2013 | Siddique | ............ | G06Q 30/0643 345/420 |
| 2014/0279248 A1* | 9/2014 | Westphal | ........... | G06Q 30/0625 705/26.62 |
| 2015/0127491 A1* | 5/2015 | Duggar | ............. | G06F 17/30702 705/26.62 |
| 2015/0235289 A1* | 8/2015 | Jeremias | ............ | G06Q 30/0613 705/26.41 |
| 2015/0287116 A1* | 10/2015 | Brown | ................... | G06Q 30/06 705/26.62 |
| 2016/0117330 A1* | 4/2016 | Nash | ................. | G06F 17/30864 705/14.69 |
| 2016/0314145 A1* | 10/2016 | Peck | ................. | G06F 17/30277 |

* cited by examiner

*Primary Examiner* — Vanel Frenel
(74) *Attorney, Agent, or Firm* — Athorus, PLLC

(57) ABSTRACT

Described are systems and methods that facilitate visual search for and price filtering of information. For example, rather than requiring a user to select a pre-defined price range (e.g., "under $25," $25 to $50," "$50 to $100") for filtering, a user may price filter search results by specifying a single price filtering value around which the search results are filtered. The range around the single price filtering value is dynamically selected based on, for example, the search results being filtered, the past purchase history of the user, past user search history, etc.

19 Claims, 10 Drawing Sheets

PRICE FILTERING BASED ON A USER SPECIFIED SINGLE PRICE FILTERING VALUE

BACKGROUND

With the ever expanding amount of accessible digital content available to users and customers, it continues to become more and more difficult to discover the items for which the user is searching. One technique for filtering search results is by the price of the item and/or the brand of the item. For example, many e-commerce websites allow users to filter search results by selecting one or more brands of interest and/or selecting a pre-defined price range (e.g., "under $25," $25 to $50," "$50 to $100"). When a user selects a brand and/or a pre-defined price range, the search results are filtered to only include those items that match the user selection(s).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
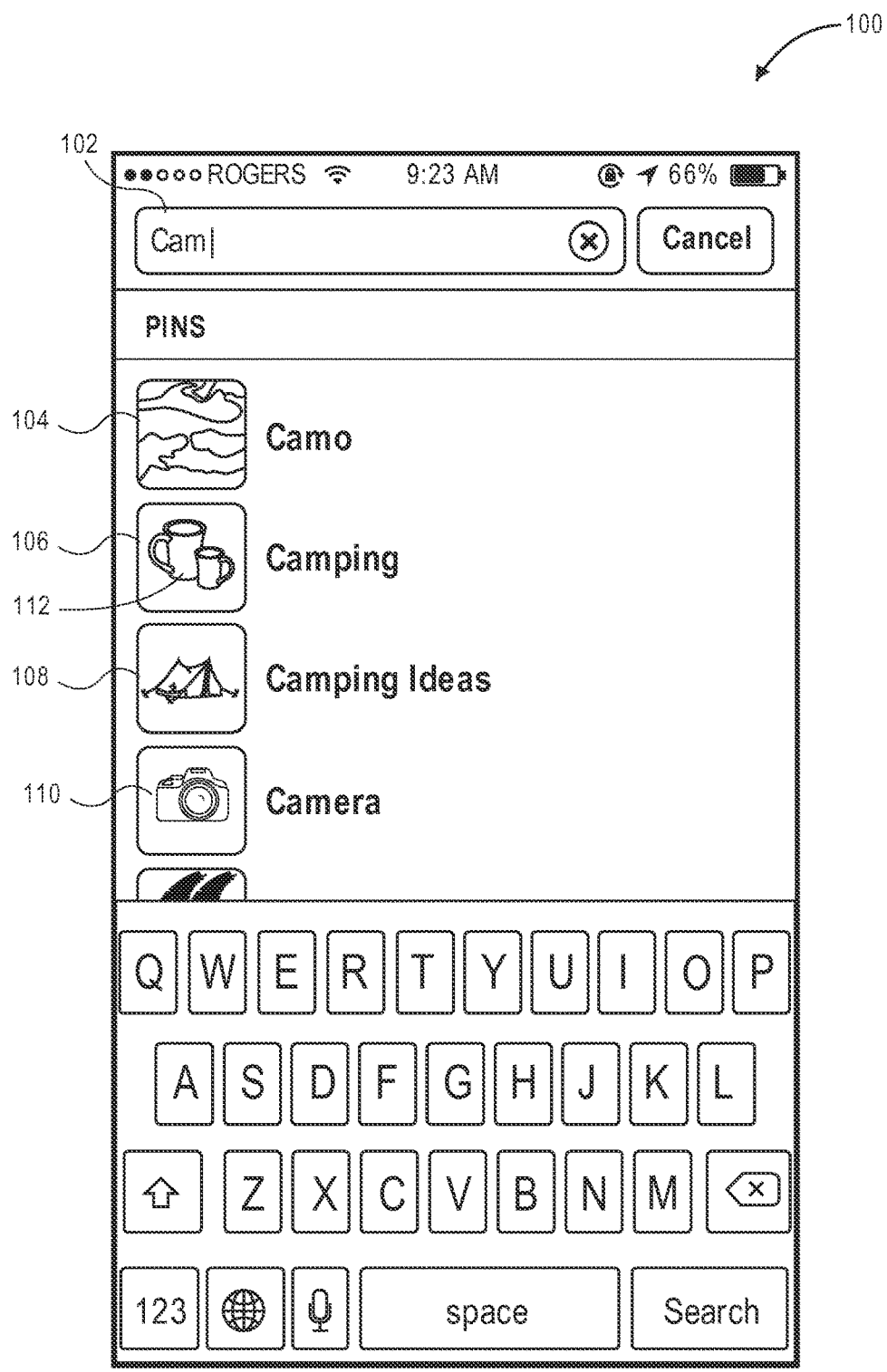
FIG. 1 is a representation of a graphical user interface for entering a search term, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described herein are systems and methods that facilitate visual search for and price filtering of information. In one implementation, rather than requiring a user to select a pre-defined price range (e.g., "under $25," $25 to $50," "$50 to $100") for filtering, a user may price filter search results by specifying a single price filtering value around which the search results are to be filtered. The range around the single price filtering value is dynamically selected based on, for example, the search results being filtered, the past purchase history of the user, past user search history, etc. For example, if a user selects a single price filtering value of $100, the implementations described herein will dynamically select a filter range, an upper price value and a lower price value that are above and below the selected single price filtering value based on the quantity of search results that have an associated price between the upper price value and the lower price value. The range, upper price value and/or the lower price value may be further adjusted based on other factors. For example, if the user typically selects or purchases items with a value above the specified single price filtering value, the upper price value may be adjusted upward to include additional search results that will potentially be of interest to the user. Likewise, the lower price value may be adjusted upward to exclude search results that are less likely to be of potential interest to the user.

In one specific example, if a user specifies a single price filtering value of $100 and the user has historically selected items above the user specified single price filtering value, rather than setting an upper price value and a lower price value that positions the user specified single price filtering value at a mid-point (e.g., lower price value of $50, upper price value of $150), the upper price value and lower price value may be adjusted so that the price range includes more items above the user specified single price filtering value. For example, the lower price value may be set at $75 and the upper price value may be set at $175.

By enabling a user to specify a single price filtering value for filtering search results and dynamically selecting a range, an upper price value and a lower price value for filtering, the results of the price filtering are more relevant to the search results and more relevant to the user performing the search. In some implementations, the presentation of the results matching the price filtering may be based on a probability of user interest in the price filtered search results. For example, rather than presenting the results in a price order (e.g., lowest price to highest price, or highest price to lowest price) with the presentation initiating at the start of the price order and allowing the user to scroll down through the results, it may be determined which item has the highest probability of interest to the user and the presentation of the price filtered search results may be initiated so that the highest probability item is initially presented to the user and the user can scroll up or down to see other price filtered search results. For example, if the user specifies a single price filtering value of $110 and the price filtered search results range in value from $80 to $200, in one implementation, it may be determined that an item having a value of $150 has the highest probability of interest to the user. In such an implementation, rather than initiating the presentation to the user at one end of the price range (e.g., lowest to highest, or highest to lowest), the price filtered search results may be ordered by value (e.g., lowest to highest or highest to lowest) for presentation and the presentation is initiated such that the user is initially presented with the item having the highest probability of interest to the user (in this example, the item having a value of $150). The user may then graphically move or scroll up or down through the price filtered search results.

FIG. 1 is a representation of a graphical user interface 100 for entering an initial search term, according to an implementation. As illustrated, a user may be presented with a search feature via a client device. A client device may include, for example, personal computers, tablet computers, eBook reader devices, laptop computers, desktop computers, netbooks, personal digital assistants (PDA), portable gaming devices, wireless communication devices, such as smart phones, wearable devices, or mobile handsets, set-top-boxes, game consoles, cameras, audio recorders/players, or any combination thereof.

Utilizing the client device, a user may enter one or more characters in a search term box 102. In this example, the user has entered the characters "Cam" into the search term box 102. As each character is entered, a list of potentially matching search terms is presented to the user for selection. Potentially matching search terms may be selected according to a variety of factors. In one implementation, potentially matching search terms may be determined based on the frequency with which those search terms are selected by other users of the system and/or based on the frequency of selection by the user entering the search term. Other factors, such as user history, location, popularity of terms, prior searches, etc., may also be considered when selecting potentially matching search terms.

In this example, the presented potentially matching search terms that begin with "Cam" are "Camo" 104, "Camping" 106, "Camping Ideas" 108, and "Camera" 110. In some implementations, the presented potentially matching terms may also include a visual representation of a corresponding result provided by that search term. For example, the search term "Camping" is accompanied by a visual representation of a result 112 matching the search term "Camping." The visual representation of the result 112 may be any result corresponding to the search term. In some implementations, the visual representation of the result 112 may be dynamically selected from matching results. For example, the visual representation of a result 112 may correspond with the most frequently viewed, rated, etc., result that corresponds with the search term. In another implementation, the visual representation of a result 112 may be determined and presented based on user specific factors. User specific factors may include past searches by the user, user preferences, other items identified as of interest to the user, etc. Regardless of the factors utilized to determine a visual representation of a result 112 to present, the visual representation of a result 112 may change over time as the popularity or other criteria for selecting the visual representation of the result changes.

A user may select a presented search term or continue typing an initial search term in the search box 102. In this example, the user selects the search term "Camping" 106.

Figure 2:
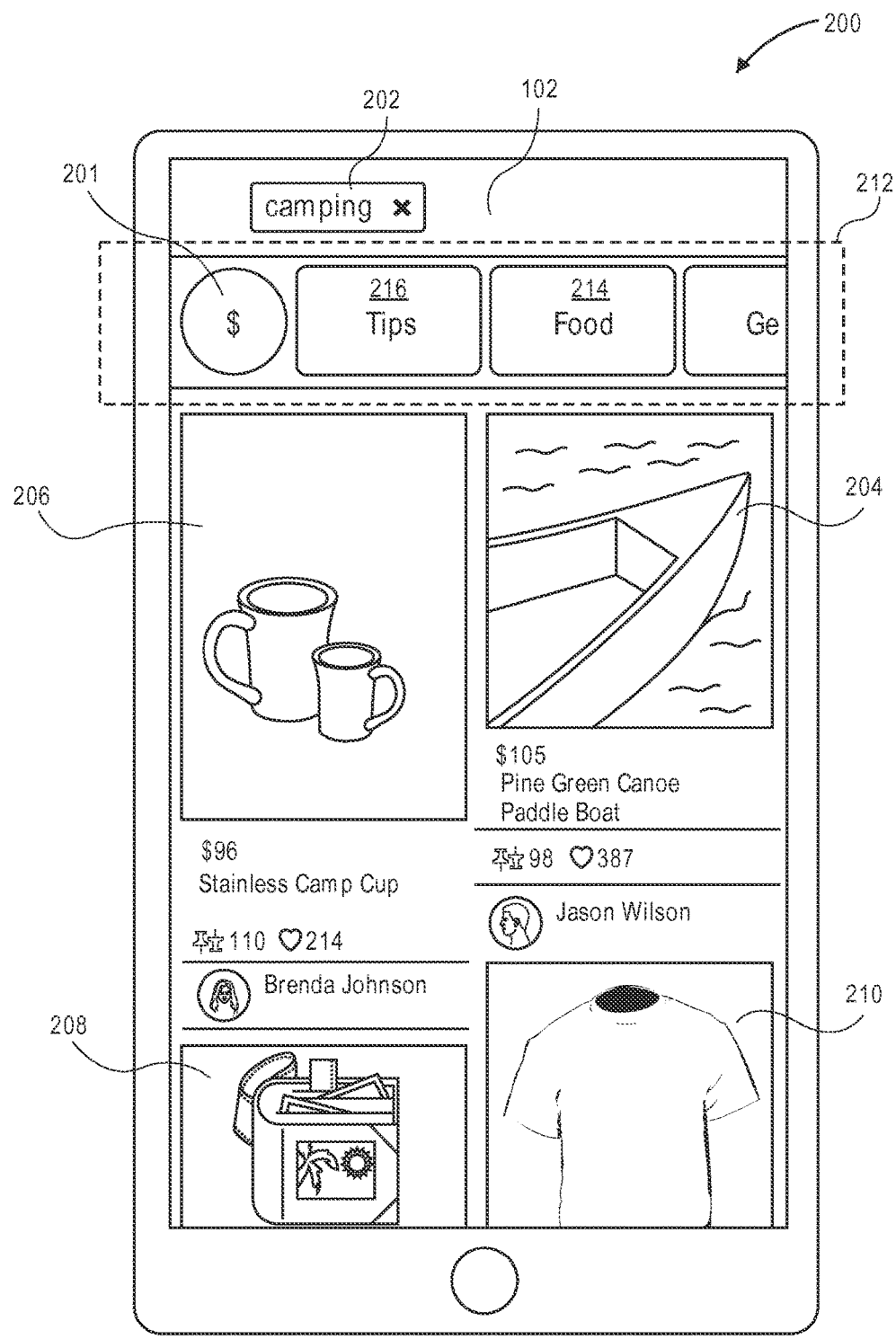
FIG. 2 is a representation of a graphical user interface illustrating results of a selected search term, according to an implementation.

FIG. 2 is a representation of a graphical user interface 200 illustrating results of a selected search term, in this example "Camping," according to an implementation. Upon selection of an initial search term (e.g., "Camping"), the search term is tokenized and visually presented as a token 202 in the search box 102. A user may remove and or change a tokenized search term. In some implementations, the tokenized search term may be associated with a color, shape, size, etc., that corresponds to results that match the search term. The visual representation of the token 202 may also be colored to correspond to the color of the most frequently matching result for the search term "Camping."

In addition to presenting the selected initial search term as a token 202, results that match the search term are also visually presented to the user. Results matching the search term may be selected according to a variety of factors. For example, results may be selected based on the rating of the results by other users, based on the frequency of selection, based on an age of the result, based on a user's profile, location, time of day, items identified as of interest to the user, language, etc. In this example, the user is visually presented with four results 204, 206, 208, 210 that correspond to the selected initial search term "Camping." A user may scroll down through the user interface 200 and be presented with additional results that correspond with the search term "Camping."

In some implementations, a search refinement bar 212 may also be presented to the user. The search refinement bar 212 includes additional search terms or filters that may be added to the selected initial search term to further refine the set of matching results. In this example, the search refinement bar 212 includes the search terms of "Tips" 216, "Food" 214, and/or additional search terms.

Rather than requiring a user to manually enter additional search terms or select from a static list of filters, the additional search terms presented in the search refinement bar 212 may be dynamically selected. The search terms presented in the search refinement bar may be based on, for example, the user preferences and/or search history, user demographics, popularity of the results corresponding to each additional search term when combined with the selected search term(s), location of the user, time of day, external events (e.g., news, advertisements) and/or other factors. Because the additional search terms are dynamically selected, the search terms presented to the user via the search refinement bar 212 may vary over time.

Figure 3:
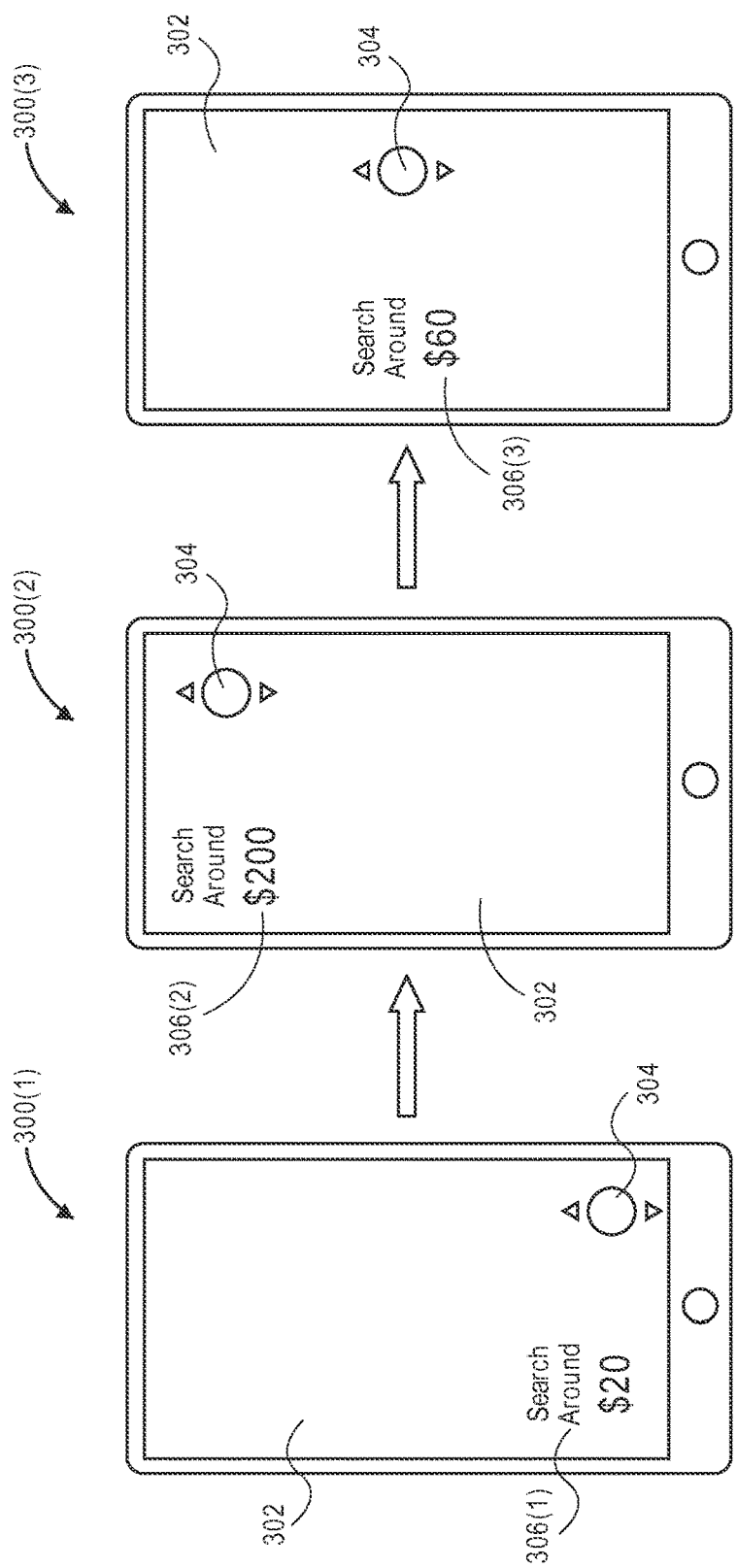
FIG. 3 is a representation of a graphical user interface for receiving a single price filtering value, according to an implementation.

In some implementations, the search refinement bar also includes a price filtering control 201 that may be selected by a user so that the user can specify a single price filtering value around which the search results are to be dynamically filtered. Upon selection of the price filtering control 201, the user is presented with the user interface illustrated in FIG. 3. While FIG. 3 illustrates the price filtering control 201 included in the search refinement bar 212, it will be appreciated that the price filtering control 201 may be presented or accessed via other means. For example, the price filtering control may be accessible through a drop-down menu, presented at another location on the user interface, initiated upon selection of a price presented on a search result, etc.

FIG. 3 is a representation of a graphical user interface 300 for receiving a single price filtering value 306, according to an implementation. In some implementations, a maximum value and a minimum value may be determined between which a single price filtering value may be selected. For example, the search results to be price filtered may be processed to determine an item having a highest price and an item having a lowest price. The maximum value may be set at or near the highest price and the minimum value may be set at or near the lowest price. When the graphical user interface 300 is presented to the user for selection of a single price filtering value, the range within which the user may specify the single price filtering value may be limited to between the maximum value and the minimum value. By determining a maximum value and a minimum value based on the search results to be filtered, the range in which the user may specify a single price filtering value corresponds to the search results and, regardless of the single price filtering value specified by the user, will result in at least one search result matching the specified single price filtering value.

In some implementations, it may be determined if there are one or more search results having a price that is an outlier compared to the price values of other search results. For example, the standard deviation of the search result price values may be determined and any values that are more than three standard deviations from the mean may be considered outliers. If outliers are determined, those values may be excluded when selecting the maximum value and the minimum value. In other implementations, the maximum value and the minimum value may include the outliers.

The graphical user interface 300 enables a user to specify a single price filtering value between the determined minimum value, which is graphically presented toward a bottom of the display 302, and a maximum value, which is graphically presented toward a top of the display 302. In some implementations, an initial presentation of the graphical user interface 300(1) may present the price filtering value at or near the minimum value, at or near the maximum value, or at any value there between. In other implementations, the initial presentation of the price filtering value 306(1) may be selected based on the user profile. For example, if the user generally searches for and/or purchases items near a mid-point between the maximum value and minimum value, the initial presentation of the single price filtering value 306(1) will be near the mid-point value. If the user generally searches for and/or purchases items closer toward the maximum value, the initial presentation of the single price filtering value 306(1) will be near the maximum value. In another example, if the user profile identifies that the user has a preference toward one or more particular brands (e.g., Brand A) of items, the initial presentation of the price filtering value 306(1) may be positioned near a value of one or more items in the search results that correspond to that brand. For example, if the user profile identifies that the user generally selects or purchases Brand A and there are Brand A items in the search results to be filtered, the initial presentation of the price filtering value may be positioned near a value of one of the Brand A items of the search results to be filtered. In some implementations, if there are multiple items of a user determined preferred brand (e.g., Brand A), it may further be determined, based on the user profile, whether the user generally purchases or selects Brand A items having a higher or lower value. The initial presentation of the price filtering value 306(1) may be near the higher or lower value, depending on whether the user generally purchases or selects Brand A items having a higher or lower value. Alternatively, the initial presentation of the price filtering value 306(1) may be near an average value of the brand A items.

A user may interact with the graphical user interface 300 through, for example, a touch-based display of a client device. A user may adjust the single price filtering value 306 by moving their finger up and/or down the touch-based display 302. For example, in the initial presentation of the graphical user interface 300(1), the single price filtering value 306(1) is $20. A user may increase the single price filtering value by selecting the scroll icon 304 and dragging the scroll icon upward on the display 302. Alternatively, or in addition thereto, the user may touch another location on the touch-based display and the presentation of the price filtering value 306 will move to the position touched by the user and a price filtering value corresponding to the touched position will be displayed. For example, as illustrated in the second presentation of the graphical user interface 300(2), the user has adjusted the single price filtering value 306(2) upward to a value of $200.

Likewise, a user may decrease the single price filtering value by selecting the scroll icon 304 and dragging the scroll icon downward on the display 302, and/or by touching another location on the touch-based display 302. For example, as illustrated in the third presentation of the graphical user interface 300(3), the user has adjusted the single price filtering value 306(3) downward to a value of $60. A user may specify a single price filtering value by removing their finger (or other input device) from the touch-based display and/or by providing another form of input indicating a selection of a presented price filtering value.

While the example illustrated in FIG. 3 describes a user specifying a single price filtering value via a touch-based display, interaction and/or specification of a single price filtering value may be accomplished through other means. For example, a user may input a single price filtering value via an input device, such as a mouse or keyboard. In another example, the client device may include a microphone and voice processing software that can receive an audible sound generated by the user and process that audible sound to determine a single price filtering value specified by the user.

As discussed further below with respect to FIGS. 6-8, when a user specifies a single price filtering value, a range, an upper value and a lower value are dynamically determined, the search results are filtered to include those having a value between the dynamically determined upper value and lower value, and filtered search results are presented to the user.

Figure 4:
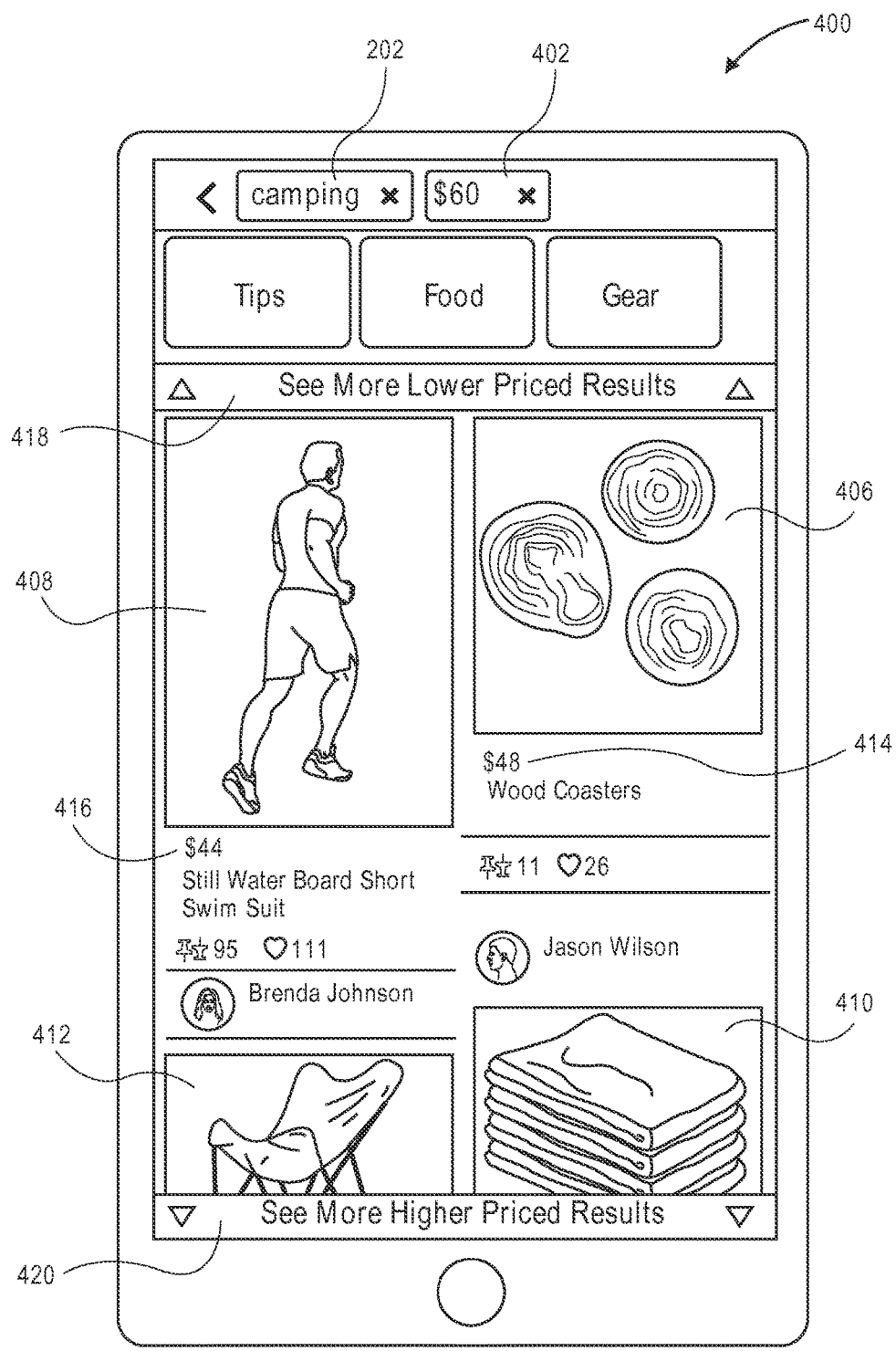
FIG. 4 is a representation of a graphical user interface illustrating a presentation of price filtered search results, according to an implementation.

FIG. 4 is a representation of a graphical user interface 400 illustrating a presentation of price filtered search results, according to an implementation. In this example, the search results corresponding to the search term "Camping" 202 have been price filtered based on a single price filtering value of "$60" 402 specified by the user. In this example, based on the search results and the user profile, the upper value has been set at $80 and the lower value has been set at $25. As discussed further below, it was determined based on the user profile associated with the user performing the search that the user typically purchases items that are below the single price filtering value specified by the user. Based on that determination, the upper value and the lower value around the user specified single price filtering value are adjusted so the filtered results include more items of potential interest to the user.

The price filtered search results are presented on the graphical user interface 400 along with information, such as price 416, about those results. In this example, four price filtered search results 406, 408, 410, 412 are initially presented to the user.

Figure 8:
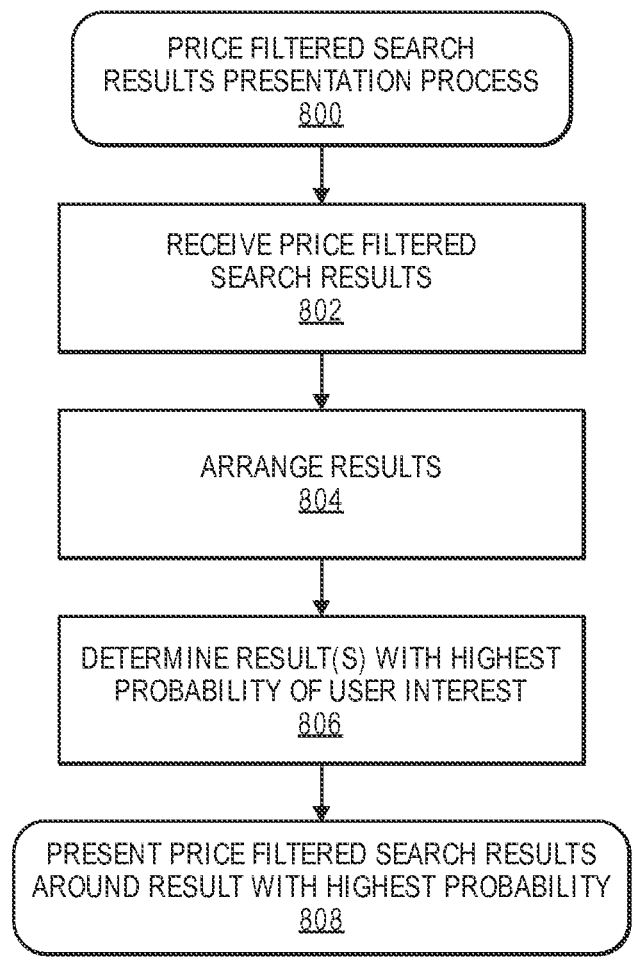
FIG. 8 is a flow diagram illustrating an example price filtered search results presentation process, according to an implementation.

In one implementation, as discussed further with respect to FIG. 8, rather than presenting the results from an end point (e.g., lowest priced item, highest priced item), based on the user profile and the price filtered search results, an item having a highest probability of interest to the user is determined and the initial presentation to the user via the graphical user interface 400 includes the item having the determined highest probability of interest to the user. In this example, it is determined that the "Wood Coasters" 406 with a value of "$48" 414 has the highest probability of interest to the user. The "Wood Coasters" are determined to have the highest probability of interest to the user because, based on past browse history of the user, as maintained in the user profile, the user has been searching for coasters. Likewise, it was determined from the user profile that the user typically selects items that are of a lower value than the user specified single price filtering value. As discussed further below, other factors may also be considered when selecting an item as having a highest probability of interest to the user.

By initially presenting the user with the price filtered item having a determined highest probability of interest to the user, the initial presentation may effectively be anywhere within the price filtered search results. For example, if the price filtered search results are ordered in value from lowest to highest, as in this example, and the item determined to have the highest probability of interest to the user is at some point between the lowest and highest value, the initial presentation of the price filtered items are presented such that the user may browse in either direction to view additional price filtered search results. In comparison, traditional systems present an ordered list of results and the presentation to the user is at one end (e.g., lowest priced item) of the ordered list.

The user may interact with the graphical user interface 400 to browse and view additional price filtered search results by scrolling up and/or down from the initial presentation of the price filtered search results. For example, the graphical user interface 400 includes an indicator 418 identifying that additional, lower priced results that are around the user specified single price filter value may be viewed by scrolling upward. Likewise, the graphical user interface 400 includes an indicator 420 identifying that additional, higher priced results that are around the user specified single price filter value may be viewed by scrolling downward. A user may interact with the price filtered search results, view details about a result/item, comment on items, share items, purchase items, etc. In some implementations, the user interface may only present price filtered results that are within the determined upper price filter and the determined lower price filter. In other implementations, the user may view and interact with any search results and the user specified single price filtering value is used to arrange the search results and/or initiate a presentation of the search results at or near the user specified single price filtering value, as illustrated in FIG. 4.

Figure 5:
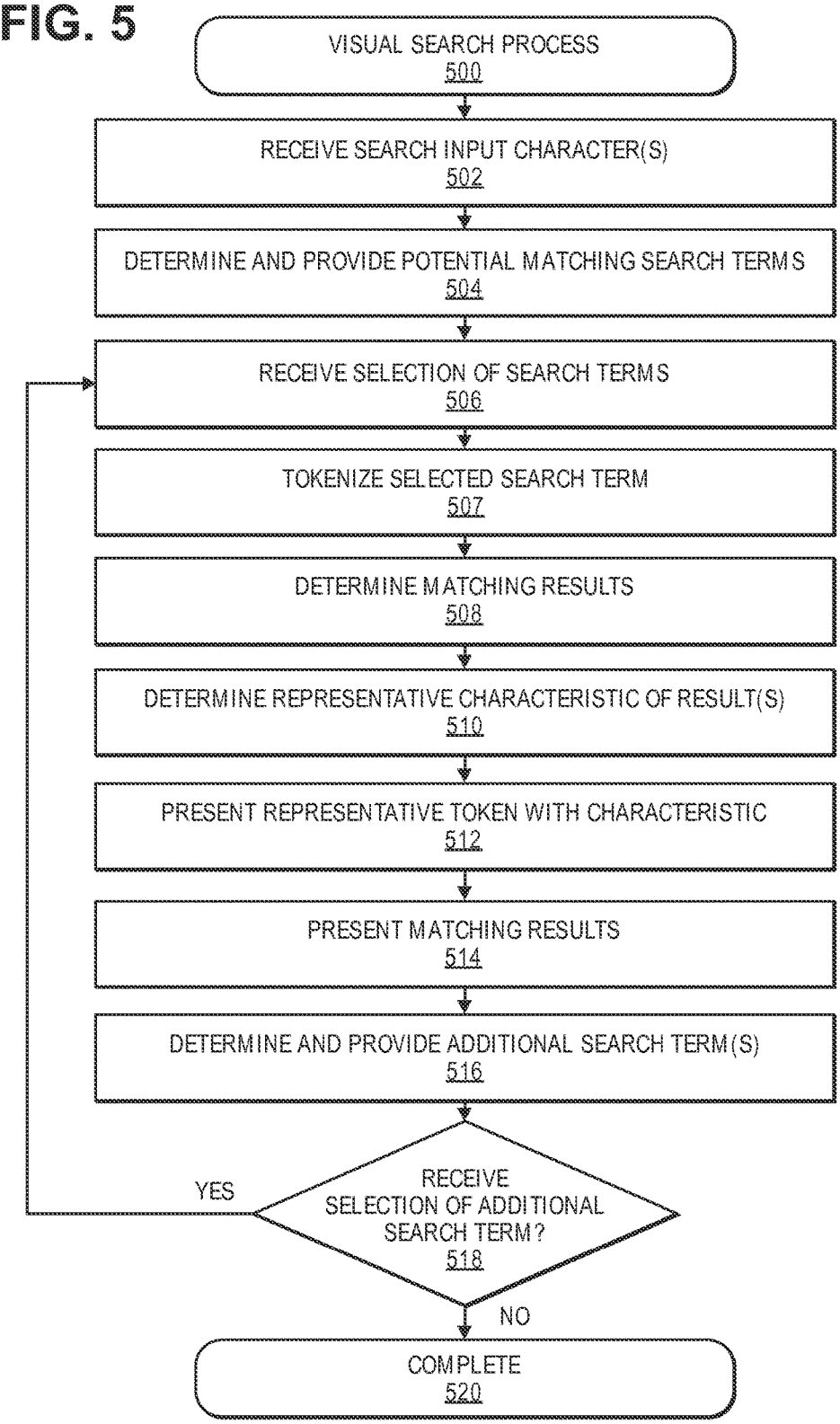
FIG. 5 is a flow diagram illustrating an example process for visually searching for information, according to an implementation.

FIG. 5 is a flow diagram illustrating an example process 500 for searching for information, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by receiving a search input character(s), as in 502, in a search box for an initial search term. Upon receiving a search input, search terms that potentially match the intent of the user's input are determined and presented to the user. For example, if the user enters a "C," search terms that start with the letter "C" are determined and the most frequently used search terms that start with the letter "C" are presented to the user, as in 504. In other implementations, other factors may be used to determine which search terms to present to the user that potentially match the characters input by the user.

After presenting the potentially matching search terms, the example process 500 receives an initial search term selection, as in 506. An initial search term may be selected by a user selecting a presented potential search term or by a user typing in a search term. The selected search term is tokenized, as in 507, and results matching the selected search term are determined, as in 508. Matching results may be any digital item that corresponds to or is otherwise related to the selected search term. For example, digital items may include metadata or tags describing the item. A digital item may be identified as matching a selected search term if one or more items of metadata or tags correspond to the search term. In some implementations, a matching result may represent an item (e.g., digital item, physical item, service) that may be purchased, leased, borrowed, etc.

A representative characteristic of one or more of the matching results is also determined, as in 510. For example, the most popular and/or top matching result may be identified and a characteristic (e.g., color) associated with the matching result may be identified. A visual token representative of the selected search term is then generated that includes the search term and the determined characteristic. The generated token is then sent for presentation to the user, as in 512. Likewise, matching results corresponding to the selected search term are also sent for presentation to the user, as in 514.

The example process may also determine one or more additional search terms that are sent for presentation to the user, as in 516. As discussed above, additional search terms may be descriptive and/or characteristic and used to further refine the matching results. A determination may then be made as to whether a selection of an additional search term is received, as in 518. An additional search term may be received by a user selecting one of the presented additional search terms and/or in response to a user typing in an additional search term. If it is determined that the user has selected an additional search term, the example process 500 returns to block 506 and continues. If the example process 500 returns to block 506 and continues, the matching results may be further refined to include only those that correspond to each selected search term. This process may repeat, with each selected search term, further refining the matching results until the user has selected a matching result. If it is determined that the user has not selected an additional search term, the example process completes, as in 520.

Figure 6:
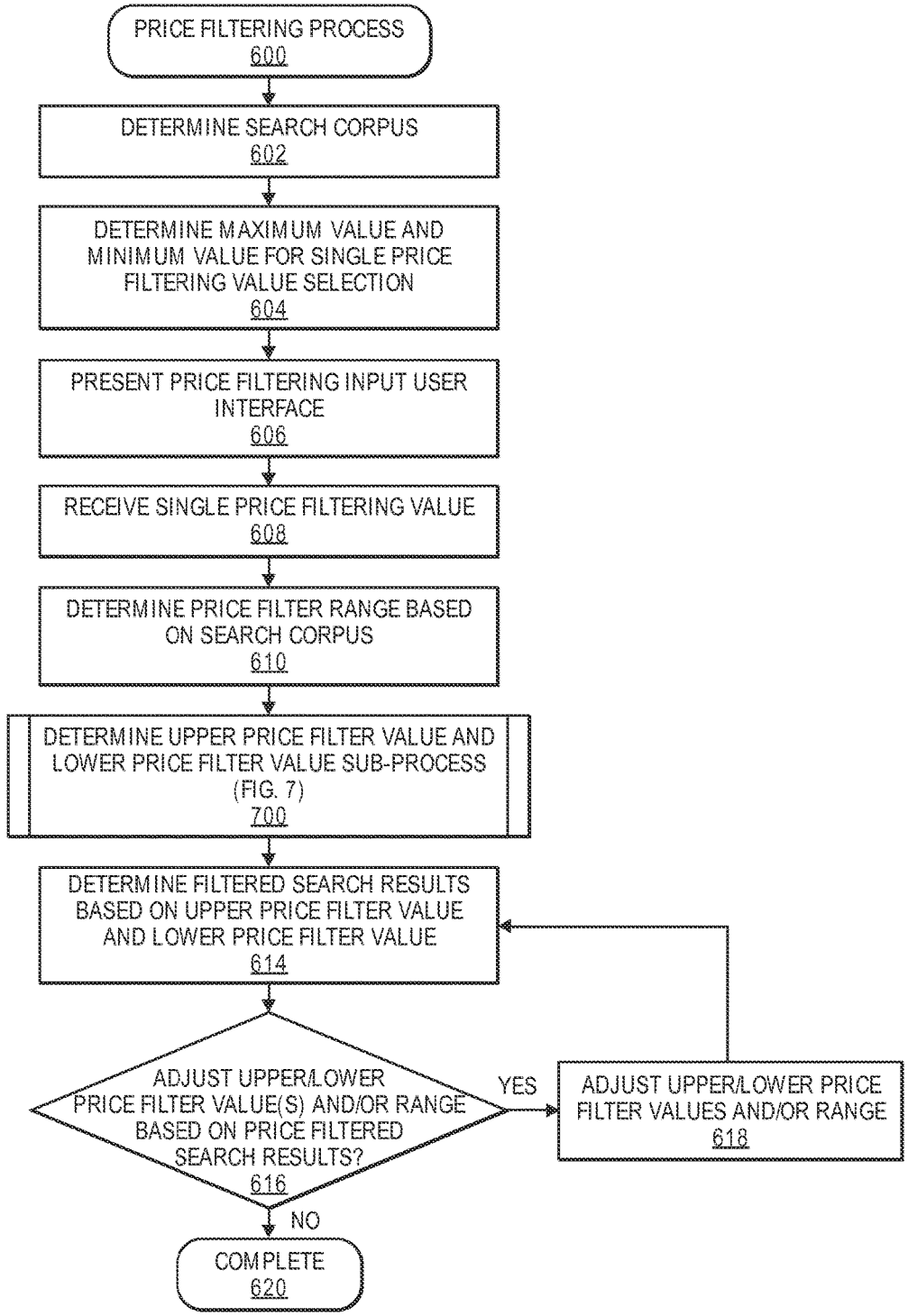
FIG. 6 is a flow diagram illustrating an example price filtering process, according to an implementation.

FIG. 6 is a flow diagram illustrating an example price filtering process 600, according to an implementation. The example process 600 begins by determining a search corpus or set of search results upon which price filtering is to be applied, as in 602. A search corpus may be any set of items or search results that are to be filtered using the example price filtering process 600. For example, as discussed above with respect to FIGS. 1-4, the search corpus may include the search results from an e-commerce or social networking site that match the search term "Camping."

Based on the items included in the search corpus, a maximum value and a minimum value that are to be used for generating a range within which a single price filtering value selection may be performed is determined, as in 604. The maximum value and the minimum value may be determined using a variety of characteristics relating to the items of the search corpus. For example, a highest priced item included in the search corpus may be determined and the maximum value may be set at or near the value of the highest priced item. In the similar manner, a lowest priced item in the search corpus may also be determined and the minimum value may be set at or near the lowest priced item value.

Based on the determined maximum value and the determined minimum value, a price filtering input user interface is generated and presented to a user for selection of a price filtering value, as in 606. In some implementations, the price filtering input user interface may be defined so that an area near a top of the presentation of the user interface corresponds with the maximum value and an area near the bottom of the presentation of the user interface corresponds with the minimum value. Likewise, a range of values between the maximum value and the minimum value may be associated with different areas on the user interface between the position of the maximum value and position of the minimum value. In presenting the price filtering input user interface, a price filtering value is presented in the user interface that may be adjusted or selected by the user. As discussed above, in some implementations, the price filtering value may be set at the minimum value, the maximum value, or at any value between the minimum value and the maximum value. In other implementations, the example process 600 may determine an item within the search corpus that has a highest probability of interest to the user, and the price filtering value may be specified initially at or near the price of the item identified as having the highest potential interest to the user. In such an example, the initial presentation of the price filtering value may be positioned on the user interface at the value of the item having the highest potential of interest to the user.

A user may specify a single price filtering value via the price filtering input user interface by adjusting or selecting the presented price filtering value, as in 608. For example, the user may interact with the price filtering input user interface and increase or decrease the presented single price filtering value until a value around which the user desires to have the search results filtered is presented. Based on the user specified single price filtering value, a price filter range is initially determined based on the items included in the search corpus, as in 610. For example, the example process 600 may specify that a defined minimum number of items are to be returned within the price filtering of the search corpus. For example, the example process 600 may set the initial range around the user specified single price filtering value to include a minimum number of the items included in the search corpus. The defined minimum number may be any value specified by the user and/or the price filtering system. For example, the minimum number may be 10, 15, 20, etc.

In addition to determining an initial price filter range, an upper price filter value and lower price filter value sub-process 700 may be performed to determine an upper price filter value and lower price filter value. The upper price filter value and lower price filter value sub-process 700 is discussed in more detail below with respect to FIG. 7. The example upper price filter value and lower price filter value determination sub-process 700 returns an upper price filter value and a lower price filter value to the example process 600.

Upon receipt of the determined upper price filter value and lower price filter value, the search corpus is filtered such that the search results having a value between the upper price filter value and the lower price filter value are determined, as in 614. In some implementations, prior to presenting the price filtered search results, a determination is made as to whether the determined upper price filter value and/or the determined lower price filter value are to be adjusted based on the price filtered search results, as in 616. For example, the determined upper price filter value, the determined lower price filter value, and/or the range between the determined upper price filter value and the determined lower price filter value may be adjusted so that a minimum number of search results are returned and/or so that no more than a maximum number of price filtered search results are returned. The minimum number of price filtered search results and/or the maximum number of price filtered search results that are to be presented to a user may be any specified value. Alternatively, in other implementations, there may be no minimum and/or maximum number of price filtered search results that are to be returned as part of the example process 600. If it is determined that the upper price filter value, lower price filter value, and/or the range between the upper price filter value and the lower price value are to be adjusted, such adjustments are made, as in 618. As noted above, the adjustments to the upper price filter value and/or the lower price filter value may be made to increase or decrease the number of filtered results. Upon adjusting the upper price filter value and/or the lower price filter value, the example process 600 returns to block 614 and continues. Returning to decision block 616, if it is determined that the upper price filter value, lower price filter value, and/or the range between the upper price filter value and the lower price filter value are not to be adjusted, the example process 600 completes, as in 620.

Figure 7:
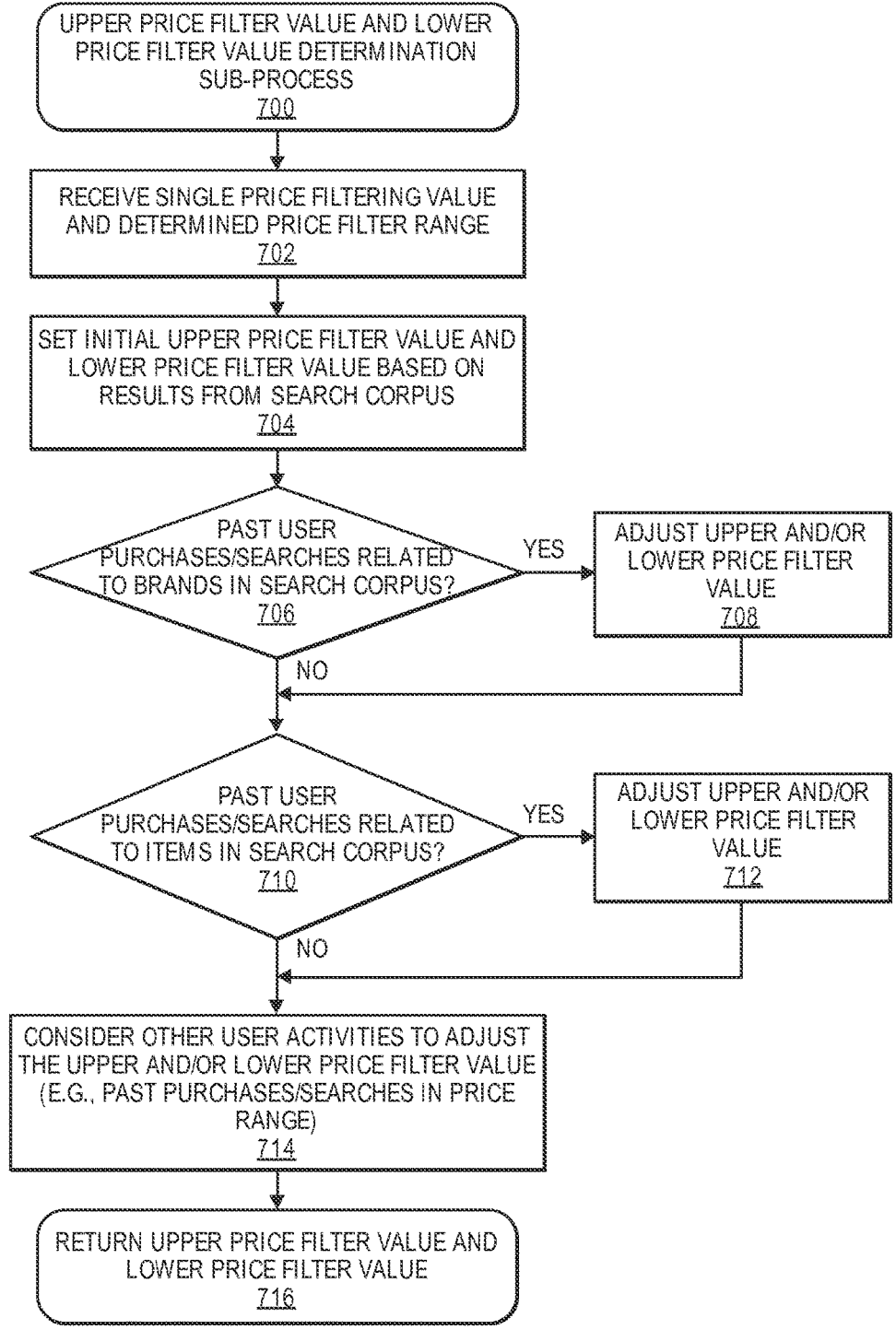
FIG. 7 is a flow diagram illustrating an example sub-process for selecting an upper price value and a lower price value for price filtering, according to an implementation.

FIG. 7 is a flow diagram illustrating an example sub-process 700 for selecting an upper price filter value and a lower price filter value for price filtering, according to an implementation. The example sub-process 700 begins by receiving a user specified single price filtering value and a determined price filter range, as in 702. Utilizing that information, the example sub-process 700 determines an initial upper price filter value that is higher than the user specified single price filtering value and an initial lower price filter value that is less than the user specified single price filtering value, as in 704. The initial upper price filter value and the initial lower price filter value may be set such that the user specified single price filtering value is at a midpoint between the upper price filter value and the lower price filter value. In other implementations, the initial upper price filter value and/or the initial lower price filter value may be set such that the user specified single price filtering value is between those values but not necessarily at a midpoint. For example, the initial lower price filter value may be closer in range to the user specified single price filtering value than the initial upper price filter value so that a minimum number of items of the search corpus are included within the price filtering results.

In some implementations, the initial upper price filter value and the initial lower price filter value may be adjusted based on information obtained from a user profile associated with the user performing the search. For example, a determination may be made as to whether past user purchases and/or past user searches have been performed related to brands of items included in the search corpus, as in 706. For example, if the search corpus includes items of a brand that a user has purchased in the past, searched for in the past, commented on in the past, etc., those items may be determined and, if the value of those items are within a defined amount of the initial upper price value and/or the initial lower price value, the upper price filter value and/or the lower price filter value may be adjusted so that those items are included in the price filtering results, as in 708. For example, if the initial upper price filter value is set at $100.00 and it is determined that an item within the search corpus is a same brand as items often purchased by the user and has a value that is within 5% of the upper price filter value, the upper price filter value may be increased so that the item is included in the price filtered search results.

As another example, a determination may be made based on the user profile associated with the user performing the search as to whether past purchases, searches, comments, ratings, etc., have been performed by the user with respect to items included in the search corpus, as in 710. For example, it may be determined from the user profile associated with the user performing the search that the user often purchases survival items when searching for camping related materials. If it is determined that past user activities correspond to items included in the search corpus that are within a defined amount of the upper price filter value or the lower price filter value, the corresponding upper price filter value or lower price filter value may be adjusted so that the determined item is included in the price filtered search results that are returned, as in 712.

After adjusting the upper price value and/or the lower price value, or if it is determined that there are no items in the search corpus or brands of items in the search corpus that correspond to past user activities, the example sub-process 700 may consider other activities of the user to adjust the upper price filter value and/or the lower price filter value, as in 714. For example, if the user typically selects and/or purchases items that are a percentage or dollar amount above the user specified single price filtering value such that those types of items would currently be outside of the upper price filter value, the example sub-process 700 may adjust the upper price filter value so that those priced items are within the results returned as part of the price filtering process. As another example, if it is determined that the user typically purchases, or selects items that are well below the user specified single price filtering value and that range of items is currently outside of the determined lower price value, the lower price filter value may be adjusted so that that range of priced items is included in the results returned as part of the price filtering process. Upon determination of the upper price filter value and the lower price filter value, the determined results are returned to the example process 600, as in 716.

FIG. 8 is a flow diagram illustrating an example price filtered search results presentation process 800, according to an implementation. The example process 800 begins by receiving the price filtered search results generated from the example process 600, as in 802. The received price filtered search results are arranged, as in 804. In one implementation, the results are arranged by the price values associated with those results. In other implementations, the results may be arranged in other manners and/or based on other criteria (new, rating, etc.). For example, the results may be based on relevance to the search terms, relevance to the price filtering value, determined relevance to the user, results that are popular with other users (trending), etc. Likewise, in some implementations, a determination is made identifying an item within the received price filtered search results that has a highest probability of user interest, as in 806. For example, activities of the user identified in the user profile associated with the user performing the price filtering may be determined and compared with the items included in the received price filtered search results to determine probabilities for each item as to the potential level of interest to the user. Such probabilities may be determined based on, for example, the activities of the user with respect to item types, item brands, user interests, etc. The user's past activities may be compared with the attributes associated with each item included in the received price filtered search results. For example, if the user frequently purchases, views, and/or comments on items of type brand A, it may be determined that items within the received price filtered search results having a brand A type have a higher probability of interest to the user than other items included in the price filtered search results. Likewise, if the user profile identifies that the user is often interested in survival related items, and one of the items of brand A is a survival related item, it may be determined that the item of type brand A that is survival related has a highest probability of potential interest to the user.

Based on the determined probabilities for the price filtered search results, the price filtered search results are presented to a user such that the presentation is centered around an item having a highest probability of interest to the user, as in 808. For example, even though the price filtered search results may be arranged or ordered by price, the presentation may be such that the initial item presented to the user having the highest probability of interest to the user is in the middle of the ordered list of items. In such an example, the presentation is effectively generated such that the user begins at a midpoint in the ordered list and the user is able to view additional price filtered items by scrolling up or scrolling down in the presentation of the price filtered search results, as discussed above with respect to FIG. 4. In other implementations, the price filtered search results may be ordered based on the probabilities of interest to the user and presented to the user in that order. By presenting price filtered search results such that the initial result presented to the user has a highest probability of interest to the user, the price filtered search results are more particular to the user and the user is presented with items around their specified price filtering range that are determined to be of a highest potential interest to the user.

Figure 9:
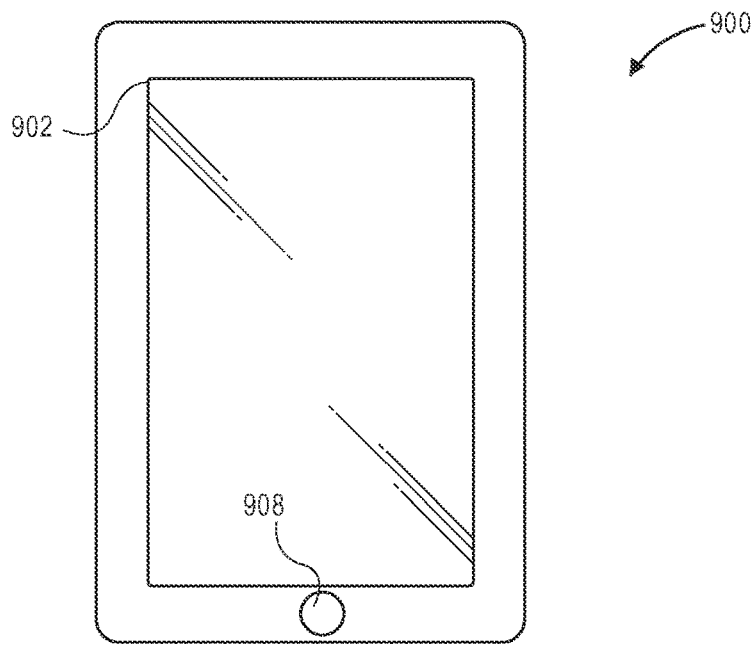
FIG. 9 illustrates an example computing device that can be used in accordance with various implementations.

FIG. 9 illustrates an example client device 900 that can be used in accordance with various implementations described herein. In this example, the client device 900 includes a display 902 and optionally at least one input component, such as a camera, on a same side of the device as the display 902. The client device 900 may also include an audio transducer, such as a speaker, and optionally a microphone 908. Generally, the client device 900 may have any form of input/output components that allow a user to interact with the client device 900. For example, the various input components for enabling user interaction with the device may include a touch-based display 902 (e.g., resistive, capacitive), camera, microphone, global positioning system (GPS), compass, or any combination thereof. One or more of these input components may be included on a device or otherwise in communication with the device. Various other input components and combinations of input components can be used as well within the scope of the various implementations as should be apparent in light of the teachings and suggestions contained herein.

Figure 10:
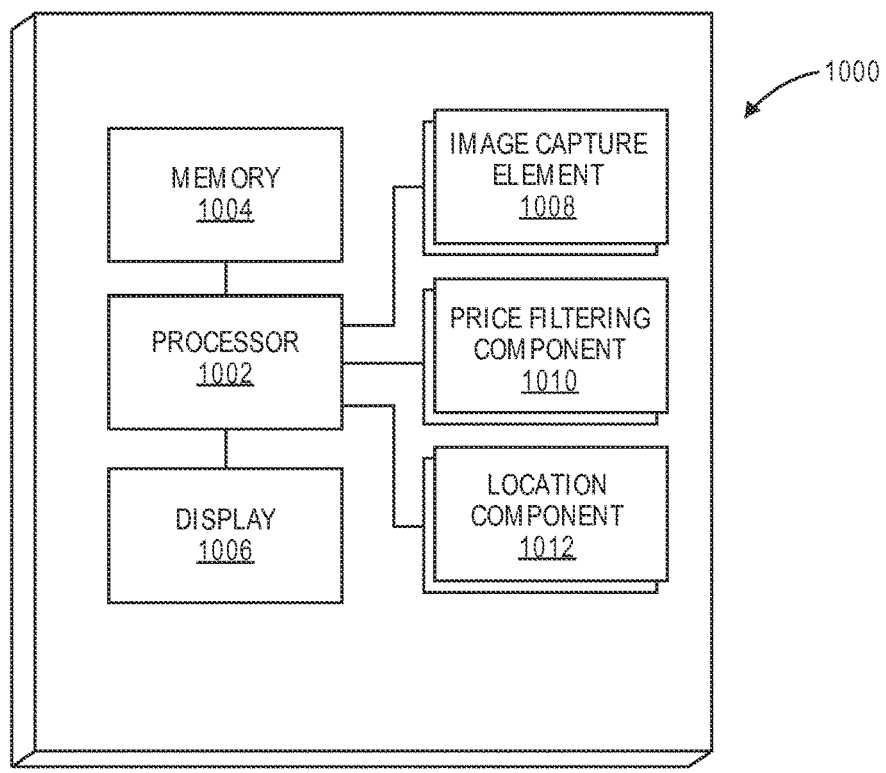
FIG. 10 illustrates an example configuration of components of a computing device, such as that illustrated in FIG. 9.

In order to provide the various functionality described herein, FIG. 10 illustrates an example set of basic components 1000 of a client device 900, such as the client device 900 described with respect to FIG. 9 and discussed herein. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instruction for execution by the processor 1002. Removable storage memory can be available for sharing information with other devices, etc. The device typically will include some type of display 1006, such as a touch-based display, organic light emitting diode (OLED) or liquid crystal display (LCD).

As discussed, the device in many implementations will include at least one image capture element 1008, such as one or more cameras that are able to image objects in the vicinity of the device. An image capture element can include or be based at least in part upon any appropriate technology, such as a CCD or CMOS image capture element having a determined resolution, focal range, viewable area, and capture rate. The device can include at least one price filtering component 1010 for performing the process of presenting a single price filtering value input user interface, price filtering search results, and/or identifying and presenting price filtered search results. For example, the client device may be in constant or intermittent communication with a remote computing resource (not shown) and may exchange information, such as selected search terms, digital items, tokens, specified price filtering values, results, etc., with the remote computing system as part of the search and/or price filtering process.

The device also can include at least one location component 1012, such as GPS, NFC location tracking or Wi-Fi location monitoring. Location information obtained by the location component 1012 may be used with the various implementations discussed herein as a factor in selecting additional search terms to present to the user, as a factor in determining which results matching selected search terms to present to the user and/or as a factor in determining probabilities of user interest in a search result.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 11:
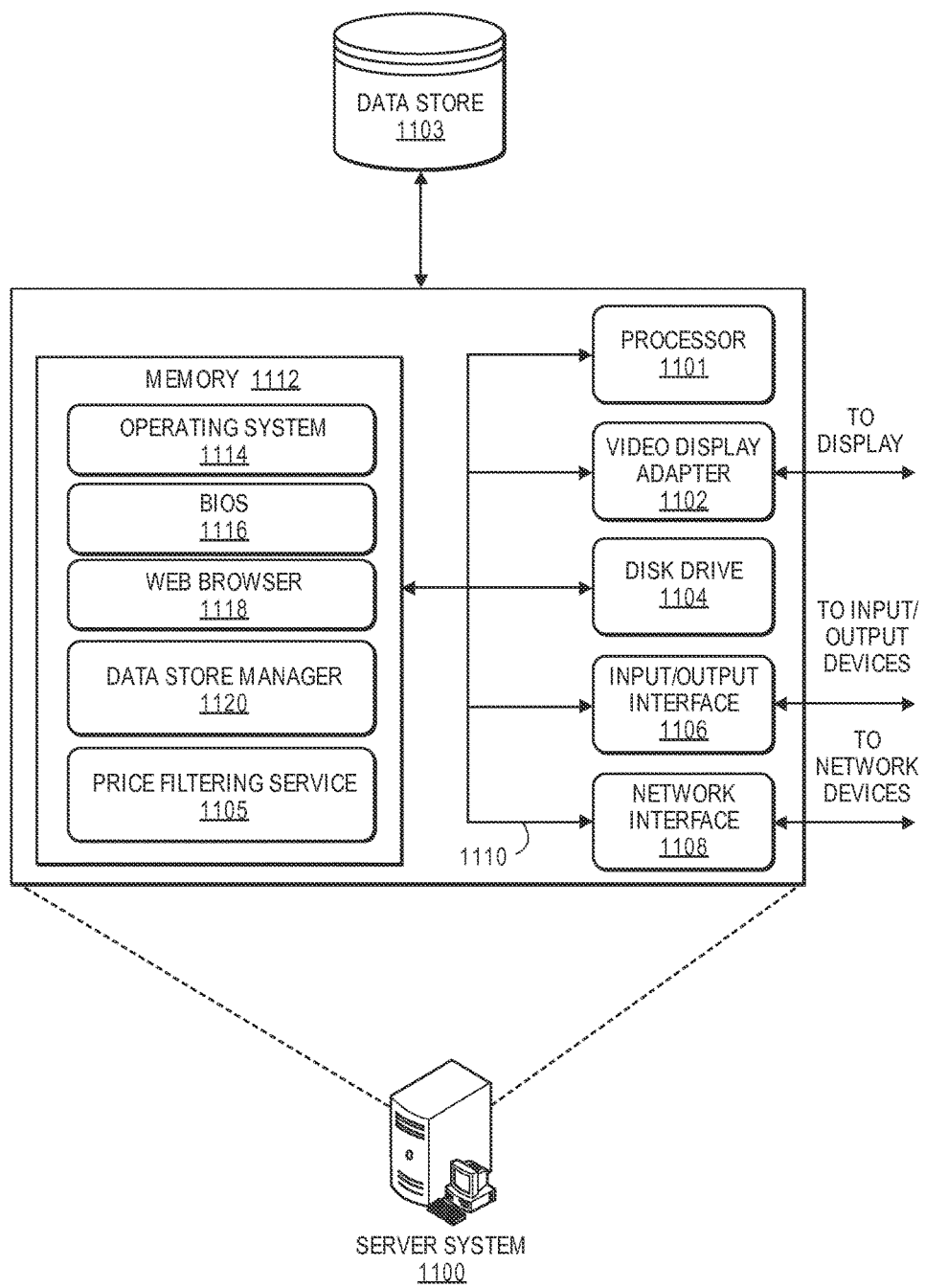
FIG. 11 is a pictorial diagram of an illustrative implementation of a server system that may be used for various implementations.

FIG. 11 is a pictorial diagram of an illustrative implementation of a server system 1100, such as a remote computing resource, that may be used with one or more of the implementations described herein. The server system 1100 may include a processor 1101, such as one or more redundant processors, a video display adapter 1102, a disk drive 1104, an input/output interface 1106, a network interface 1108, and a memory 1112. The processor 1101, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 1100 to monitor and configure operation of the server system 1100. The input/output interface 1106 likewise communicates with external input/output devices not shown in FIG. 11, such as a mouse, keyboard, scanner, or other input and output devices that can be operated by an operator of the server system 1100. The network interface 1108 includes hardware, software, or any combination thereof, to communicate with other computing devices. For example, the network interface 1108 may be configured to provide communications between the server system 1100 and other computing devices, such as the client device 900, via the network 1000, as shown in FIG. 10.

The memory 1112 generally comprises random access memory (RAM), read-only memory (ROM), flash memory, and/or other volatile or permanent memory. The memory 1112 is shown storing an operating system 1114 for controlling the operation of the server system 1100. A binary input/output system (BIOS) 1116 for controlling the low-level operation of the server system 1100 is also stored in the memory 1112.

The memory 1112 additionally stores program code and data for providing network services that allow client devices 900 and external sources to exchange information and data files with the server system 1100. Accordingly, the memory 1112 may store a browser application 1118. The browser application 1118 comprises computer executable instructions, that, when executed by the processor 1101, generate or otherwise obtain configurable markup documents such as Web pages. The browser application 1118 communicates with a data store manager application 1120 to facilitate data exchange and mapping between the data store 1103, client devices, such as the client device 900, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1100 can include any appropriate hardware and software for integrating with the data store 1103 as needed to execute aspects of one or more applications for the client device 900, the external sources and/or the Search service 1105. The server system 1100 provides access control services in cooperation with the data store 1103 and is able to generate content such as matching search results, additional search terms, digital items, text, graphics, audio, and/or video related information (e.g., representations, context, descriptions, mappings) to be transferred to the client device 900.

The data store 1103 can include several separate data tables, databases or other data storage mechanisms and media for storing data relating to a particular aspect. For example, the data store 1103 illustrated includes digital items and corresponding metadata about those items. Search history, user preferences, user profiles and other information may likewise be stored in the data store.

It should be understood that there can be many other aspects that may be stored in the data store 1103, which can be stored in any of the above listed mechanisms as appropriate or in additional mechanisms of any data store. The data store 1103 may be operable, through logic associated therewith, to receive instructions from the server system 1100 and obtain, update or otherwise process data in response thereto.

The memory 1112 may also include the price filtering service 1105. The price filtering service 1105 may be executable by the processor 1101 to implement one or more of the functions of the server system 1100. In one implementation, the price filtering service 1105 may represent instructions embodied in one or more software programs stored in the memory 1112. In another implementation, the price filtering service 1105 can represent hardware, software instructions, or a combination thereof.

The server system 1100, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable medium having computer-executable instructions stored thereon that, when executed, cause a computer system having at least one computer processor to perform a method comprising:
    determining a search corpus that includes a plurality of items, each item having an associated price value;
    receiving a user specified single price filtering value;
    determining, based on the user specified single price filtering value, an upper price filter value and a lower price filter value, wherein the lower price filter value is a non-zero value, and wherein the upper price filter value is greater than the user specified single price filter value and the lower price filter value is less than the user specified single price filter value;
    filtering the search corpus to determine price filtered search results that include only items of the search corpus having an associated value between the upper price filter value and the lower price filter value; and
    causing a first item included in the price filtered search results to be presented to the user via a graphical user interface.

2. The non-transitory computer-readable medium of claim 1, wherein causing at least one item included in the price filtered search results to be presented to the user includes:
    causing a first plurality of items of the price filtered search results to be presented above the first item on the graphical user interface;
    causing a second plurality of items of the price filtered search results to be presented below the first item on the graphical user interface; and
    enabling navigation of the price filtered search results from the first item in either an upward direction to view the first plurality of items or in a downward direction to view the second plurality of items of the price filtered search results.

3. The non-transitory computer-readable medium of claim 1, wherein determining the upper price filter value and the lower price filter value includes:
    determining a range around the user specified price filtering value that includes at least a minimum number of items that have a price value within the range.

4. The non-transitory computer-readable medium of claim 3, wherein determining the upper price filter value and the lower price filter value includes:
    setting the lower price filter value at a first value that is less than the user specified price filtering value;
    setting the upper price filter value at a second value that is greater than the user specified price filtering range; and
    wherein the lower price filter value and the upper price filter value corresponds with the range.

5. The non-transitory computer-readable medium of claim 1, the method further comprising:
    determining a first item of the plurality of items having a highest price value;
    setting a maximum value based on the highest price value;
    determining a second item of the plurality of items having a lowest price value;
    setting a minimum value based on the lowest price value; and
    generating a single price filtering value selection interface that enables selection by the user of a single price filtering value that is between the maximum value and the minimum value.

6. A computing system, comprising:
    a processor; and
    a memory coupled to the processor and storing program instructions that when executed by the processor causes the processor to at least:
        determine a first plurality of items to be price filtered, wherein each item of the first plurality of items includes an associated price value;
        present to a user a single price filtering user interface that enables a user to specify a single price filtering value;
        receive, based on an interaction by the user with the single price filtering user interface, a user specified single price filtering value;
        determine, based on the user specified single price filtered value, an upper price filter value and a lower price filter value, wherein the upper price filter value is greater than the user specified single price filtered value, and wherein the lower price filter value is less than the user specified single price filtered value and is a non-zero value;
        determine a second plurality of items having a price value that is less than or equal to the upper price filter value and greater than or equal to the lower price filter value; and
        present at least one of the second plurality of items to the user.

7. The computing system of claim 6, wherein the upper price filter value and the lower price filter value are determined such that at least a minimum number of the first plurality of items have a price value that is greater than or equal to the lower price filter value and less than or equal to the upper price filter value.

8. The computing system of claim 6, wherein the user specified single price filter value is at an approximate mid-point between the upper price filter value and the lower price filter value.

9. The computing system of claim 6, wherein the user specified single price filter value is above a mid-point between the upper price filter value and the lower price filter value.

10. The computing system of claim 6, wherein the user specified single price filter value is below a mid-point between the upper price filter value and the lower price filter value.

11. The computing system of claim 6, wherein the program instructions that when executed by the processor further cause the processor to at least:
   determine that the user is likely more interested in items having a higher price value than the user specified price filtering value; and
   wherein the program instructions that when executed by the processor to determine the upper price filter value and the lower price filter value further include instructions that when executed by the processor further cause the processor to at least:
      set the upper price filter value at a first amount above the user specified price filtering value; and
      set the lower price filter value at a second amount below the user specified price filtering value, wherein the first amount is greater than the second amount such that a majority of the second plurality of items have a price filter value that is greater than the user specified price filtering value.

12. The computing system of claim 6, wherein the program instructions that when executed by the processor further cause the processor to at least:
   determine that the user is likely more interested in items having a lower price value than the user specified price filtering value; and
   wherein the program instructions that when executed by the processor to determine the upper price filter value and the lower price filter value further include instructions that when executed by the processor further cause the processor to at least:
      set the upper price filter value at a first amount above the user specified price filtering value; and
      set the lower price filter value at a second amount below the user specified price filtering value, wherein the first amount is less than the second amount such that a majority of the second plurality of items have a price filter value that is less than the user specified price filtering value.

13. The computing system of claim 6, wherein the program instructions that when executed by the processor further cause the processor to at least:
   determine, based on the associated price values of the plurality of items, a maximum value; and
   define the single price filtering user interface such that the maximum value is at or near a top of a display of the single price filter user interface.

14. The computing system of claim 13, wherein the program instructions that when executed by the processor further cause the processor to at least:
   determine, based on the associated price values of the plurality of items, a minimum value; and
   define the single price filtering user interface such that the minimum value is at or near a bottom of a display of the single price filter user interface.

15. The computing system of claim 14, wherein:
   the interaction is a selection by the user of a position on the display that is between the minimum value and the maximum value; and
   the program instructions that when executed by the processor further cause the processor to at least determine the user specified price filtering value based on the position on the display.

16. A computer-implemented method, comprising and under control of one or more computing systems configured with executable instructions:
   identifying a plurality of unfiltered search results corresponding to a search term, each of the unfiltered search results having a corresponding price value;
   receiving at a device, a user specified price filtering value for use in price filtering the plurality of unfiltered search results;
   determining a range around the user specified price filtering value, the range comprising at least an upper price filtering value and a lower price filtering value, wherein the upper price filtering value is greater than the user specified single price filtering value, and wherein the lower price filtering value is less than the user specified single price filtering value and is a non-zero value;
   filtering the plurality of unfiltered search results to produce a set of user price filtered search results; and
   presenting to the user price filtered search results, each of the user price filtered search results having a price value within the range.

17. The computer-implemented method of claim 16, wherein determining the upper price value or determining the lower price value is based on at least one of a quantity of the plurality of items having a price value within the range, a past purchase by a user, a past search by a user, a past comment of a user, or an item included in the plurality of items.

18. The computer-implemented method of claim 16, wherein determining the upper price value or determining the lower price value includes determining a probability of a user's interest in an item of the plurality of unfiltered search results.

19. The computer-implemented method of claim 16, wherein determining the upper price value or determining the lower price value is based at least in part on a first likelihood that a user will select a search result having a price value above the user specified price filtering value and a second likelihood that the user will select a search result having a price value below the user specified price filtering value.

* * * * *